(12) United States Patent
Kamimura

(10) Patent No.: US 7,963,174 B2
(45) Date of Patent: Jun. 21, 2011

(54) ULTRASONIC FLOWMETER HAVING A RUBBER TRANSMITTING BODY

(75) Inventor: Shinobu Kamimura, Nobeoka (JP)

(73) Assignee: Asashi Organic Chemicals Industry Co., Ltd., Nobeoka-Shi, Miyazaki (JP)

( * ) Notice: Subject to any disclaimer, the term of this patent is extended or adjusted under 35 U.S.C. 154(b) by 87 days.

(21) Appl. No.: 12/417,837

(22) Filed: Apr. 3, 2009

(65) Prior Publication Data
US 2009/0249889 A1    Oct. 8, 2009

(30) Foreign Application Priority Data
Apr. 3, 2008   (JP) .................................. 2008-097299

(51) Int. Cl.
*G01F 1/66* (2006.01)
(52) U.S. Cl. ....................................... 73/861.27; 73/570
(58) Field of Classification Search .......................... None
See application file for complete search history.

(56) References Cited

U.S. PATENT DOCUMENTS

| | | | |
|---|---|---|---|
| 5,354,956 A * | 10/1994 | Orban et al. ................... 181/105 |
| 6,604,433 B1 | 8/2003 | Azuma et al. |
| 6,699,192 B2 * | 3/2004 | Ogawa ........................... 600/437 |
| 7,075,524 B2 * | 7/2006 | Kobayashi et al. ........... 345/173 |
| 7,307,373 B2 * | 12/2007 | Straub et al. .................. 310/334 |
| 7,373,840 B2 * | 5/2008 | Kamimura .................. 73/861.27 |
| 7,397,168 B2 * | 7/2008 | Straub et al. .................. 310/338 |
| 7,557,490 B2 * | 7/2009 | Straub et al. .................. 310/337 |
| 2007/0151361 A1 | 7/2007 | Kamimura |

FOREIGN PATENT DOCUMENTS

| | | |
|---|---|---|
| JP | 8-615 A | 1/1996 |
| JP | 2001-50785 A | 2/2001 |
| JP | 2005-188974 A | 7/2005 |
| JP | 2006-208159 A | 8/2006 |

* cited by examiner

*Primary Examiner* — Harshad Patel
(74) *Attorney, Agent, or Firm* — Buchanan Ingersoll & Rooney PC

(57) ABSTRACT

An ultrasonic flowmeter includes two ultrasonic transceivers. Each of the ultrasonic transceivers includes a cylindrical transmitting body closely fixed to the outer peripheral surface of a measurement pipe through a fluid flows so as to surround the measurement pipe, and an ultrasonic transducer surrounding the measurement pipe and spaced apart from the outer peripheral surface of the measurement pipe. The transmitting body is made of a rubber material and has axial end surfaces extending perpendicular to the axis of the measurement pipe. The axial end surface of the ultrasonic transducer is fixedly secured to the axial end surface of the transmitting body, and the ultrasonic transducer is extended and contracted in the axial direction thereof by applying a voltage between the axial end surfaces of the ultrasonic transducer.

21 Claims, 3 Drawing Sheets

ULTRASONIC FLOWMETER HAVING A RUBBER TRANSMITTING BODY

BACKGROUND OF THE INVENTION

1. Field of the Invention

The present invention relates to an ultrasonic flowmeter, for use in fluid transportation in various industries of chemical plants, semiconductor manufacture field, food processing field and biotechnology field, etc., which propagates ultrasonic vibration through a fluid and measures the flow velocity and flow rate of the fluid from the difference between the ultrasonic wave propagation time from the upstream side and the ultrasonic wave propagation time from the downstream side of the fluid flow, or more specifically, to an ultrasonic flowmeter suitable for measuring a micro flow rate and the flow rate of a slurry fluid or especially a CMP slurry fluid used in the semiconductor field.

2. Description of the Related Art

A conventional ultrasonic flowmeter, as disclosed, for example, in Japanese Unexamined Patent Publication No. 2006-208159, as shown in FIG. 8, includes two openings 53a, 53b formed, in opposed relation to each other at two positions spaced apart from each other in the direction of the fluid flow in a pipe member 51, on a pipe wall 52 of a pipe member 51 through which the fluid flows, and two ultrasonic transceivers 54a, 54b disposed in two openings 53a, 53b, respectively, and used for measuring the flow rate of the fluid flowing through pipe member 51. Two ultrasonic transceivers 54a, 54b are located outside the boundary with the inner peripheral surface of pipe wall 52 of pipe member 51 in corresponding openings 53a, 53b, respectively. The gap between each of ultrasonic transceivers 54a, 54b in openings 53a, 53b and the corresponding boundary with the inner peripheral surface of pipe wall 52 of pipe member 51 is filled with an ultrasonic propagation substance 55 so as not to cause any disturbance of the fluid flowing through pipe member 51 at the boundary of each of two openings 53a, 53b with the inner peripheral surface of pipe wall 52 of pipe member 51. In this conventional ultrasonic flowmeter, it is easy to position two ultrasonic transceivers 54a, 54b relative to pipe member 51 or mount/demount two ultrasonic transceivers 54a, 54b to/from pipe member 51, and the flow rate of the fluid flowing through pipe member 51 can be measured with high accuracy.

However, in this conventional ultrasonic flowmeter, ultrasonic transceivers 54a, 54b are disposed in opposed relation to each other at two positions spaced apart from each other in the direction of the fluid flow, and the propagation distance of the ultrasonic wave is naturally short. Therefore, a problem occurs in which the accuracy of flow rate measurement is not high. Further, an attempt to secure a long propagation distance of the ultrasonic wave would require a larger diameter of the pipe member 51 than a predetermined value, and therefore, a problem is posed that the conventional ultrasonic flowmeter is not suitable for measurement of the flow rate of a fluid flowing through a small-bore pipe. Another problems are that since the positions of ultrasonic transceivers 54a, 54b are fixed, the measurement accuracy cannot be adjusted appropriately as the ultrasonic flowmeters can be arranged only in a predetermined space in the pipe and that the structure is so complicated that the assembly work is bothersome.

SUMMARY OF THE INVENTION

Accordingly, it is an object of the present invention to overcome the problems of the prior art described above and provide a compact and inexpensive ultrasonic flowmeter, which can measure the flow rate with high accuracy by efficiently propagating the ultrasonic vibration through the fluid in a small-bore pipe, has a high adhesion between the transmitting body and the pipe body, allows the installation position of the transmitting body to be freely changed, and requires no adhesive in order to mount the ultrasonic flowmeter to the pipe body.

According to the present invention, there is provided an ultrasonic flowmeter including two ultrasonic transceivers mounted in spaced relation to each other in an axial direction on an outer peripheral surface of a pipe through which a fluid flows, the ultrasonic flowmeter determining a flow velocity of the fluid by receiving an ultrasonic vibration transmitted from one of the two ultrasonic transceivers through the fluid in the pipe with the other ultrasonic transceiver, alternately switching between the ultrasonic transceiver on the transmitting side and the ultrasonic transceiver on the receiving side, and measuring the ultrasonic wave propagation time between the two ultrasonic transceivers, wherein each of the ultrasonic transceivers includes a cylindrical transmitting body closely fixed to the outer peripheral surface of the pipe so as to surround the pipe and an ultrasonic transducer surrounding the pipe and spaced apart from the outer peripheral surface of the pipe, the transmitting body having an axial end surface perpendicular to the axis of the pipe, the ultrasonic transducer having axial end surfaces one of which is fixedly secured to the axial end surface of the transmitting body, the ultrasonic transducer adapted to be extended and contracted in an axial direction thereof by applying a voltage between the axial end surfaces of the ultrasonic transducer, the transmitting body made of a rubber material.

Generally, an ultrasonic transducer generates the largest vibration energy in a direction of voltage application. In the ultrasonic flowmeter according to the present invention, the axial end surface of the ultrasonic transducer is closely fixed to the axial end surface of the transmitting body and extended and contracted in the axial direction thereof. Therefore, the ultrasonic vibration generated by the ultrasonic transducer can be efficiently transmitted to the fluid through the transmitting body. Since the axial end surface of the ultrasonic transducer is fixedly secured to the axial end surface of the cylindrical transmitting body, a large area for transmission of the ultrasonic vibration can be secured between the ultrasonic transducer and the transmitting body and a large ultrasonic vibration energy can be transmitted from the ultrasonic transducer to the transmitting body, especially in the case where the ultrasonic transducer has a shape of a disk with a center hole. Further, since the transmitting body is closely fixed so as to surround the outer periphery of the pipe, the ultrasonic vibration can be propagated though the whole periphery of the pipe to the fluid in the pipe, thereby allowing a larger ultrasonic vibration energy to be propagated to the fluid in the pipe. Accordingly, the present invention realizes a compact ultrasonic flowmeter capable of measurement with high sensitivity. It should be noted that the term "cylindrical" of the cylindrical transmitting body of the ultrasonic flowmeter according to the present invention may include a configuration wherein a notch is formed on the outer periphery of the transmitting body.

In addition, since the ultrasonic transducer is spaced apart from the outer peripheral surface of the pipe, the ultrasonic vibration cannot be transmitted directly to the pipe. Therefore, the vibration transmitted through the pipe, i.e., the disturbances against the measurement which otherwise might be caused, can be reduced. As a result, the measurement sensitivity of the ultrasonic flowmeter according to the present invention is further improved.

In the ultrasonic flowmeter described above, the pipe has an outer diameter D and the transmitting body is formed with a through hole having an inner diameter d determined so as to satisfy a relation of $0.8D \leqq d \leqq 0.95D$.

The rubber material preferably has an ultrasonic wave attenuation rate of 0 to 50 dB/cm·MHz.

Preferably, the rubber material has a cis-1,4 bond content.

Preferably, the transmitting body is made of butadiene rubber or a copolymerized rubber of butadiene rubber and an additive.

Preferably, the transmitting body is of a shape having an outer diameter progressively decreasing from the axial end surface with the ultrasonic transducer fixedly secured thereto toward the other axial end surface.

Preferably, the ultrasonic transducer has a shape of a disk with a center hole.

Further, the ultrasonic transducer and the transmitting body may be formed of a plurality of divided parts in the peripheral direction along the outer peripheral surface of the pipe.

The pipe may be also made of resin.

The transmitting body may be also integrated with the pipe.

The present invention has the configuration described above, and the superior effects described below can be obtained by using the present invention.

(1) As the transmitting body is made of a rubber material, it can be closely contacted with the pipe body taking advantage of the elasticity of the rubber material, so that the very close contact between the transmitting body and the pipe body can be achieved. Therefore, the ultrasonic wave transmitted from the ultrasonic transducer can be efficiently propagated.

(2) As the transmitting body can be closely fixed to the pipe body taking advantage of the elasticity of the rubber material, no adhesive is required to fix the transmitting body to the pipe body.

(3) As the installation position of the transmitting body can be freely changed taking advantage of the elasticity of the rubber material, the transmitting body can be arranged in a way conforming with the limited space, and the interval between the ultrasonic transceivers can be adjusted such that the measurement is possible with an optimum waveform.

(4) As the ultrasonic transceivers can be installed on a straight pipe, pressure loss is small and the fluid is not stagnated even if the fluid is slurry or the like. Therefore, the flow rate of the CMP slurry fluid used in the semiconductor field can be measured.

(5) Each ultrasonic transceiver is configured of a cylindrical transmitting body and an ultrasonic transducer and the axial end surface of the ultrasonic transducer is fixed to the axial end surface of the transmitting body so that the ultrasonic vibration of the ultrasonic transducer in the direction along the thickness thereof (in the direction parallel to the axis of the pipe) can be propagated to the fluid in the measurement pipe. Therefore, the ultrasonic vibration energy generated by the ultrasonic transducer can be efficiently transmitted to the fluid in the measurement pipe. As a result, the ultrasonic flowmeter according to the present invention can make a highly accurate, measurement of a micro flow rate even with a measurement pipe having a small bore.

(6) As each ultrasonic transducer is spaced apart from the outer peripheral surface of the measurement pipe, the ultrasonic vibration cannot be directly propagated from the ultrasonic transducer to the measurement pipe. Therefore, the ultrasonic vibration and other external disturbances transmitted through the pipe wall and resulting in a noise caused by the ultrasonic transducer can be reduced, thereby making a highly accurate flow rate measurement possible.

(7) As the ultrasonic transducer and the transmitting body are arranged so as to surround the measurement pipe and the ultrasonic vibration is propagated to the fluid in the pipe from the whole periphery of the pipe, a large vibration energy can be applied to the fluid, thereby making a highly sensitive measurement possible.

BRIEF DESCRIPTION OF THE DRAWINGS

The above and other objects, features and advantages of the present invention will be described below in more detail based on preferred embodiments of the present invention with reference to the accompanying drawings, in which.

DETAILED DESCRIPTION

Figure 1:
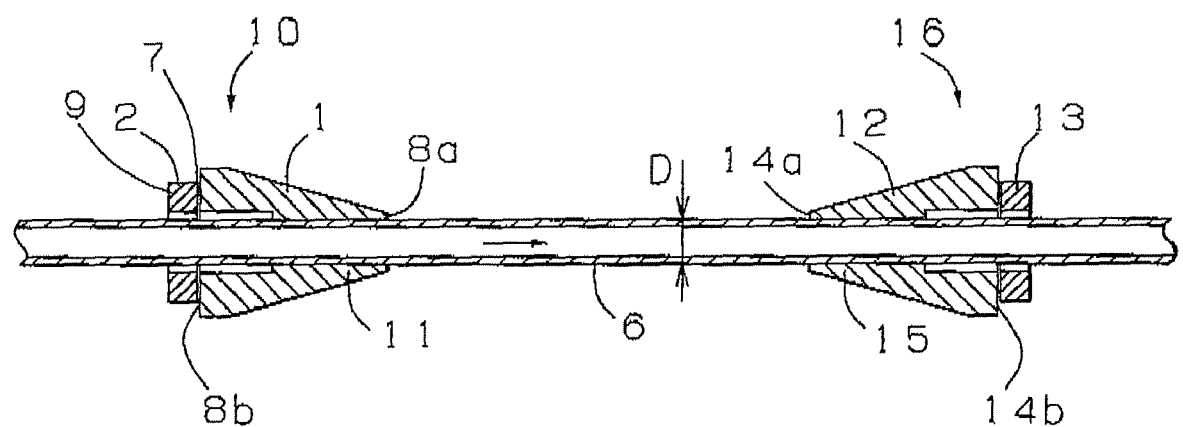
FIG. 1 is a longitudinal sectional view showing a first embodiment of the present invention.

While embodiments of the present invention will be described below with reference to FIGS. 1 to 7, the present invention is not limited thereto.

First, a first embodiment of the present invention will be described with reference to FIG. 1 to 3. The ultrasonic flowmeter according to the first embodiment includes a transmitting body 1 and an ultrasonic transducer 2. Transmitting body 1, made of butadiene rubber, has a substantially conical shape and is arranged so as to surround a measurement pipe 6 made of fluorinated resin. Transmitting body 1 has two axial end surfaces 8a, 8b extending in a direction perpendicular to the axis of measurement pipe 6. A through hole 3 including a front through hole 5 and a rear through hole 4 is formed at the center of transmitting body 1. Rear through hole 4 has an increased diameter larger than that of front through hole 5, so that, when the inner peripheral surface of front through hole 5 is closely fixed on the outer peripheral surface of measurement pipe 6 made of fluorinated resin by the elasticity of butadiene rubber, the inner peripheral surface of rear through hole 4 is spaced from measurement pipe 6. Front through hole 5 is formed to have an inner diameter d of 3.6 mm equal to 0.95D, where D is an outer diameter of measurement pipe 6 as long as 4.0 mm. Although fluorinated resin is used as the material of measurement pipe 6 in this embodiment, especially, the fluorinated resin having a high corrosion resistance such as polytetrafluoroethylene, polychlorotrifluoroethylene, polyvinylidene fluoride or tetrafluoroethyelene perfluoro alkyl vinylether copolymer is also suitable. Measurement pipe 6 can be made of suitable resin other than fluorinated resin, such as polyvinyl chloride resin, polyethylene, polypropylene or polyphenylene sulfide resin.

Although butadiene rubber is used as the material of transmitting body 1 in this embodiment, the material of transmitting body 1 may be another rubber material having a good ability to propagate the ultrasonic vibration, such as silicone rubber, styrene butadiene rubber, polyurethane rubber, natural rubber, isoprene rubber, chloroprene rubber or any copolymer thereof.

As the fluid measured by the ultrasonic flowmeter according to the present invention, a fluid having an acoustic characteristic in which a sound velocity is in the range of 1000 to 1700 m/s is mainly used. Measurement pipe 6 is made of resin and a resin having an acoustic characteristic in which a sound velocity is of 1000 to 2800 m/s is used as such a resin. Further, in view of the fact that it is desirable that the sound velocity in the rubber material is as proximate as that in the material of the fluid or measurement pipe 6 in order to reduce the attenuation of the ultrasonic wave at the propagation of the ultrasonic wave to the fluid, a rubber material having an acoustic characteristic in which the sound velocity is in the range of 1000 to 2800 m/s is preferably used for transmitting body 1. Also, in order to make it possible to transmit the ultrasonic vibration generated by ultrasonic transducer 2 from transmitting body 1 to transmitting body 12, the attenuation rate of the rubber material used for transmitting bodies 1, 12 is preferably in the range of 0 to 50 dB/cm·MHz. The rubber materials described above can be cited as an example of a rubber material which satisfies these requirements, i.e. a rubber material having the sound velocity of 1000 to 2800 m/s and the attenuation rate of 0 to 50 dB/cm·MHz.

Further, each material is preferably selected so as to achieve the highest propagation efficiency of the ultrasonic wave basically in the case where the fluid is water. Specifically, it is preferable to use, as the materials of measurement pipe 6 and transmitting body 1, materials having acoustic characteristics close to a reference acoustic characteristic in which the sound velocity is about 1500 m/s in water at normal temperature and the acoustic impedance is about $1.5 \times 10^6$ Kg/m$^2$·s because the attenuation of the ultrasonic wave passing through the boundary between different materials can be suppressed. The rubber material of transmitting body 1 preferably has an acoustic characteristic in which the sound velocity at normal temperature is in the range of 1300 to 1700 m/s and the acoustic impedance is in the range of $1.0 \times 10^6$ to $1.8 \times 10^6$ Kg/m$^2$·s. On the other hand, the lower attenuation rate is preferable, and in order to suppress the attenuation of the propagating ultrasonic wave to about $\frac{1}{10}$, the attenuation rate is more preferably not more than 20 dB/cm·MHz. Taking the above facts into consideration, butadiene rubber is preferably used as a rubber material meeting the conditions in which the sound velocity at normal temperature is in the range of 1300 to 1700 m/s, the acoustic impedance is in the range of $1.0 \times 10^6$ to $1.8 \times 10^6$ Kg/m$^2$·s and the attenuation rate is not more than 20 dB/cm·MHz. In order to improve other characteristics while maintaining the superior ultrasonic wave propagation characteristic of butadiene rubber, a copolymerized rubber formed by reacting butadiene with an additive may be used.

In addition, the rubber material is made of diene rubber having a double bond content in the molecules thereof and preferably has a cis-1,4 bond content. The ultrasonic vibration can be considered to propagate at a higher efficiency in the rubber material having a high rebound resilience. Therefore, in order to achieve a rubber material of a high elasticity, the rubber material preferably has a cis-1,4 bond content of at least 20%. The transmissibility of the ultrasonic vibration is reduced for a rubber material having a rebound resilience lower than 50%. Therefore, the rebound resilience of the rubber material is preferably not lower than 50%. The rubber material is required to have a cis-1,4 bond content of not less than 90% such as what is called "high cis" in order to improve the rebound resilience. Therefore, the rubber material has more preferably a cis-1,4 bond content of not less than 90%, and further more preferably a cis-1,4 bond content of not less than 96%.

Although transmitting body 1 has been described as having the substantially conical shape, it may have a disk shape, a hemisphere shape, a sphere shape or any other shape capable of efficiently propagating the ultrasonic vibration and the shape of transmitting body 1 is not limited to a particular shape. In other words, transmitting body 1 may be arranged on measurement pipe 6 so as to prevent the ultrasonic vibration from being transmitted from ultrasonic transducer 2 described later to measurement pipe 6. Also, grease may be used between transmitting body 1 and measurement pipe 6.

Figure 4:
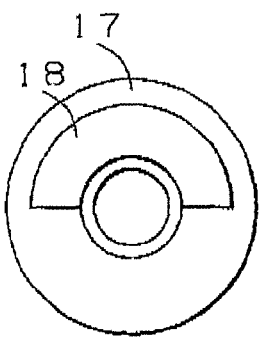
FIG. 4 is a left side view showing an ultrasonic transducer of the present invention having a semicircular shape.

Ultrasonic transducer 2 is formed by using a piezoelectric material such as lead zirconate titanate (PZT) and has a donut shape or a shape of a disk with a center hole. Axial end surface 7 of ultrasonic transducer 2 is bonded under pressure by epoxy resin to the whole of one axial end surface 8b of transmitting body 1, while a vibration insulator (not shown) is applied or bonded by adhesive to the other axial end surface 9 and the outer peripheral surface of ultrasonic transducer 2 to be closely fixed to them. Ultrasonic transducer 2 has an inner diameter substantially equal to the diameter of rear through hole 4 of transmitting body 1, and an inner peripheral surface spaced apart from the outer peripheral surface of measurement pipe 6. Also, axial end surface 7 electrically functions as an earth terminal. Ultrasonic transducer 2 is closely fixed to transmitting body 1 in this way to form an upstream ultrasonic transceiver 10. Although ultrasonic transducer 2 in this embodiment has a shape of a disk with a center hole, it may have a sector or circular shape, or an ultrasonic transducer 18 having a semicircular shape may be closely fixed to a transmitting body 17 as shown in FIG. 4. Also, although the inner peripheral surface of ultrasonic transducer 2 is spaced apart from the outer peripheral surface of measurement pipe 6, it may be closely fixed to measurement pipe 6 with a material for cutting off the ultrasonic vibration (vibration insulator) interposed between them.

A downstream ultrasonic transceiver 16 also has a configuration similar to that of upstream ultrasonic transceiver 10. Two ultrasonic transceivers 10, 16 are axially spaced apart from each other on the outer periphery of measurement pipe 6 with the transmitting bodies 1, 12 thereof facing each other.

Since transmitting body 1 of the ultrasonic flowmeter according to the present invention is made of the rubber material, transmitting body 1 can be closely fixed to measurement pipe 6 by inserting transmitting body 1 into measurement pipe 6 under pressure taking advantage of elasticity of the rubber material. Therefore, the contact between transmitting body 1 and measurement pipe 6 is improved. As a result, the ultrasonic wave transmitted from ultrasonic transducer 2 can be efficiently propagated to measurement pipe 6, and transmitting body 1 can be fixed to measurement pipe 6 without using any adhesive. Further, since transmitting body 1 is not bonded to the measurement pipe 6 by any adhesive as described above, an installation position of transmitting body 1 can be freely changed. Therefore, even in the case where an installation space available for the ultrasonic flowmeter in the piping line is limited, transmitting body 1 can be arranged in a way conforming with the available installation space. The interval between ultrasonic transceivers 10 and 16 can be also adjusted such that the measurement is possible with an optimum waveform by changing the installation position of transmitting body 1 depending on conditions such as a fluid type and a temperature. Front hole 5 of transmitting body 1 has an inner diameter d determined so as to preferably satisfy a relation of $0.8D \leqq d \leqq 0.95D$, or more preferably a relation of $0.88D \leqq d \leqq 0.93D$ with outer diameter D of measurement pipe 6. Inner diameter d of front through hole 5 of transmitting body 1 is desirably not less than 0.8D in order to easily mount transmitting body 1 to measurement pipe 6 without large deformation, while inner diameter d of front through hole 5 is desirably not more than 0.95D in order to achieve an effect of closely contacting transmitting body 1 with the outer periphery of measurement pipe 6 so as to closely clamp the outer periphery of measurement pipe 6.

Since transmitting body 1 is formed in a cylindrical shape so as to surround measurement pipe 6, a compact and inexpensive ultrasonic flowmeter can be provided.

Next, the operation of the ultrasonic flowmeter according to the first embodiment of the present invention will be described with reference to FIG. 1. A fluid to be measured flows through the inside of measurement pipe 6 in a filled state in a direction indicated by solid arrow of FIG. 1. As measurement pipe 6 is of a straight type, no pressure loss is caused and the possibility of stagnating of slurry or the like can be reduced. When a voltage pulse or a voltage having no frequency component is applied from a converter (not shown) to ultrasonic transducer 2 of ultrasonic transceiver 10 located on the upstream side along the fluid flow direction, ultrasonic transducer 2 generates a vibration in a direction along the thickness thereof (i.e. a direction of voltage application) and in a diametrical direction (i.e., in a direction perpendicular to the direction of the voltage application). In the ultrasonic transceiver 10, a voltage is applied between axial end surfaces 7 and 9 of ultrasonic transducer 2 with axial end surface 7 closely fixed to axial end surface 8b of transmitting body 1, so that the ultrasonic vibration wave in the direction along the thickness, which has a larger ultrasonic vibration energy, is propagated to axial end surface 8b of the transmitting body 1. On the other hand, as the ultrasonic vibration wave along the diametrical direction of ultrasonic transducer 2 is absorbed by vibration insulator to remove the reverberation of the ultrasonic wave, it cannot be propagated to the surroundings.

The ultrasonic vibration thus propagated to transmitting body 1 is further propagated toward a front portion 11 thereof through transmitting body 1. It is presumed that the ultrasonic vibration propagated to front portion 11 is transmitted through the outer periphery of the pipe through the pipe wall, to the fluid in measurement pipe 6 with the enhanced directivity thereof toward the center of measurement pipe 6 and is then propagated through the fluid in a direction substantially parallel to the axis of the pipe while spreading like a fan. Then, from front portion 15 of transmitting body 12 of ultrasonic transceiver 16 located in an opposed relation on the downstream side, the ultrasonic vibration is propagated through the inside of transmitting body 12 and through axial end surface 14b (the end surface far from axial end surface 14a on the side of transmitting body 11) to transducer 13 and is converted into an electrical signal, which is output to the converter.

In transmitting body 1, the substantially conical shape thereof enhances the directivity of the ultrasonic vibration toward the inside of measurement pipe 6, and the use of butadiene rubber having a high ultrasonic propagation characteristic and a low ultrasonic wave attenuation among all the rubber materials suppresses the attenuation of the amplitude of the ultrasonic vibration. Generally, duralumin or the like is cited as a suitable metal material in terms of an ultrasonic wave propagation characteristic thereof. Butadiene rubber has an ultrasonic wave propagation characteristic equivalent to that of duralmin. For example, in the case that an ultrasonic transducer is attached to the center of each of two surfaces of a duralmin plate and a butadiene rubber plate, each plate having a size of 20 mm×20 mm and a thickness of 10 mm, and the ultrasonic wave is transmitted at a voltage 10 Vp-p from the ultrasonic transducer on one surface of each plate and a voltage is measured when the ultrasonic wave is received by the ultrasonic transducer on the other surface of the same plate, the voltage measurement is 3.1 Vp-p for the duralmin plate and 3.08 Vp-p for the butadiene rubber plate and therefore the equivalent ultrasonic wave propagation can be made. Further, since butadiene rubber has a larger elasticity than the metal, it can come into very close contact with measurement pipe 6. Therefore, butadiene rubber has advantages that it does not require any adhesive to be fixedly bonded to measurement pipe 6 and also that it is not corroded by a corrosive fluid which may flow. Since ultrasonic transducer 2 is not in contact with, but is spaced apart from, measurement pipe 6 and measurement pipe 6 and transmitting body 1 are made of different materials, the ultrasonic vibration and other external disturbances transmitted through the pipe wall and resulting in one of the causes of noises can be reduced, thereby making a highly accurate flow rate measurement possible. Further, since axial end surface 7 of ultrasonic transducer 2 electrically functions as an earth, a highly accurate flow rate measurement with a reduced noise is made possible.

When the ultrasonic vibration is transmitted from upstream ultrasonic transceiver 10 to and received by downstream ultrasonic transceiver 16, the transmission and receipt are instantaneously switched in the converter, and a voltage pulse or a voltage having no frequency component is applied from the converter to ultrasonic transducer 13 of downstream ultrasonic transceiver 16. Then, the ultrasonic vibration, as in upstream ultrasonic transceiver 10, is generated in downstream ultrasonic transceiver 16 and propagated through transmitting body 12 to the fluid in measurement pipe 6. This ultrasonic vibration is again propagated from front portion 11 of transmitting body 1 of ultrasonic transceiver 10 located on the upstream side, in opposed relation to upstream ultrasonic transceiver 16, through transmitting body 1 and through axial end surface 8b to ultrasonic transducer 2 and is converted into an electrical signal, which is output to the converter. In the process, the ultrasonic vibration is propagated against the fluid flow in measurement pipe 6. Therefore, as compared with the case in which a voltage pulse or a voltage having no frequency component is applied to upstream ultrasonic transceiver 10, the propagation rate of the ultrasonic vibration in the fluid is low and the propagation time is lengthened.

In the converter, from the electric signals thus output, the propagation time of the ultrasonic vibration from upstream ultrasonic transceiver 10 to downstream ultrasonic transceiver 16 and the propagation time of the ultrasonic vibration from downstream ultrasonic transceiver 16 to upstream ultrasonic transceiver 10 are measured and the difference between them is determined. Based on the difference, the fluid velocity and flow rate are calculated, so that a highly accurate flow rate measurement is made possible.

Figure 5:
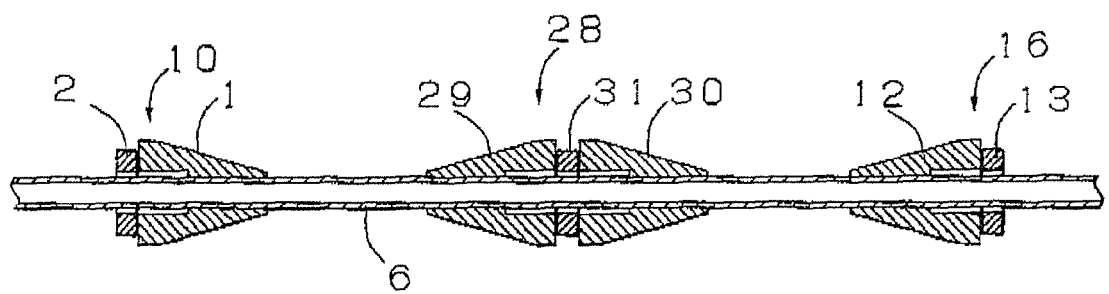
FIG. 5 is a longitudinal sectional view showing a second embodiment of the invention.

Next, a second embodiment of the present invention will be described with reference to FIG. 5.

An ultrasonic transceiver 28 is configured of transmitting bodies 29, 30, and an ultrasonic transducer 31. In ultrasonic transceiver 28, ultrasonic transducer 31 is held between transmitting bodies 29, 30, and axial end surfaces of transmitting bodies 29, 30 are closely fixed to two axial end surfaces, respectively, of ultrasonic transducer 31 by a way similar to the first embodiment. Only front portions of transmitting bodies 29, 30 are closely fixed to measurement pipe 6. Further, ultrasonic transceiver 28 is spaced apart from and arranged between ultrasonic transceivers 10 and 16 of the first embodiment, with the transmitting bodies 29, 30 facing ultrasonic transceivers 10, 16, respectively, and functions only as a transmitter. The operation of this embodiment shall be described below. When a pulse voltage or a voltage having no frequency component is applied to ultrasonic transceiver 28, the ultrasonic vibration is propagated from the front portions of transmitting bodies 29, 30 through measurement pipe 6, and received by ultrasonic transceivers 10, 16 operating as upstream and downstream receivers, respectively. Then, the fluid velocity and the flow rate are measured based on the difference between the propagation time of the ultrasonic vibration from the upstream side and the propagation time of the ultrasonic vibration from the downstream side. In this embodiment, the ultrasonic vibration toward the upstream side and the ultrasonic vibration toward the downstream side are generated at the same time, and therefore the fluid velocity and the flow rate can be measured with a higher accuracy and a quicker response.

Figure 6:
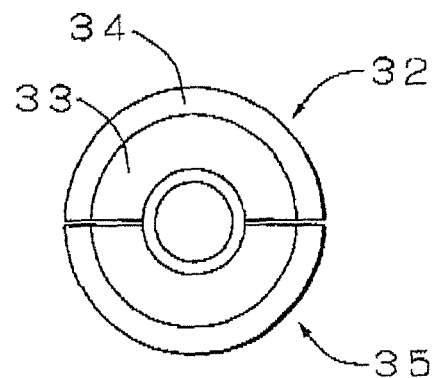
FIG. 6 is a left side view showing a third embodiment of the present invention.
Figure 7:
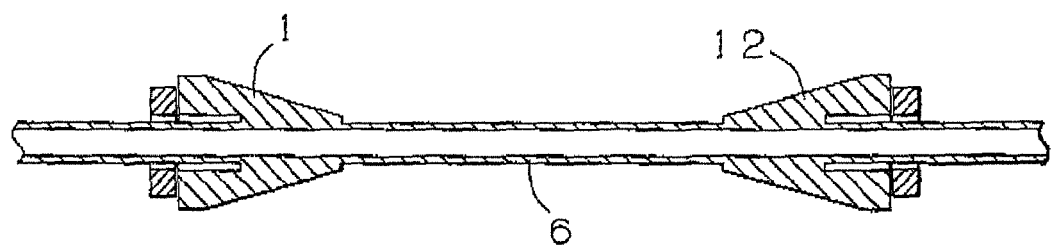
FIG. 7 is a longitudinal sectional view showing a variation of the first embodiment of the present invention.
Figure 8:
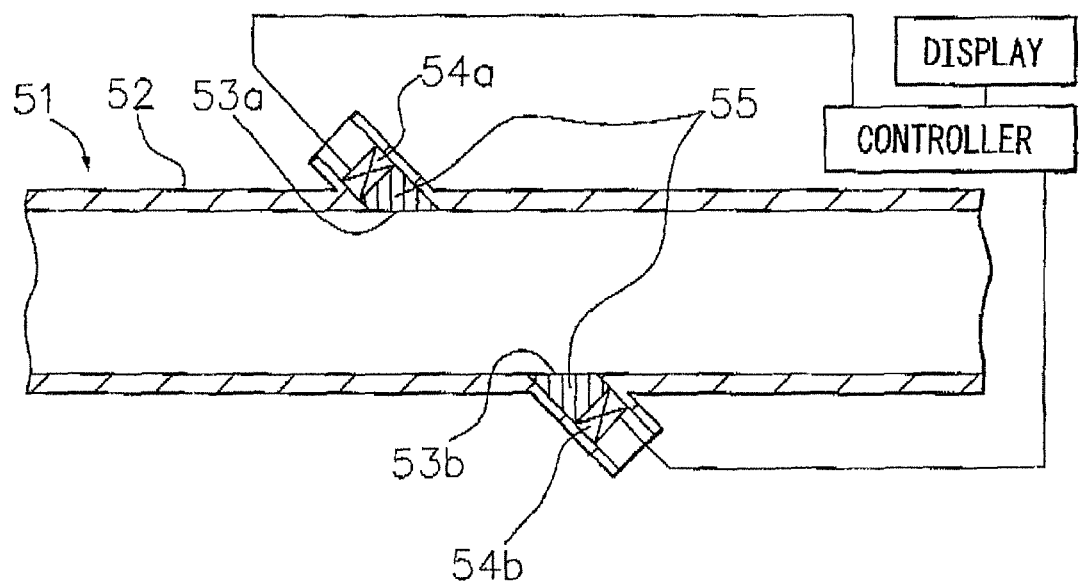
FIG. 8 is a longitudinal sectional view showing a conventional ultrasonic flowmeter.

Next, a third embodiment of the present invention will be described below with reference to FIG. 6.

Figure 2:
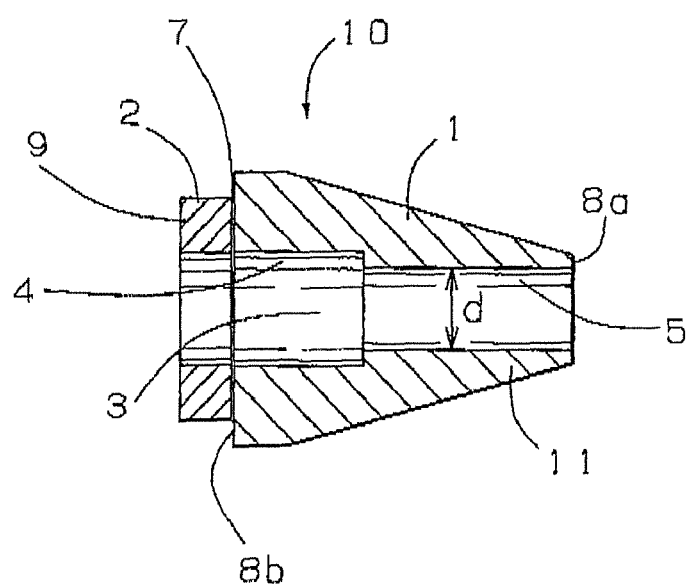
FIG. 2 is a longitudinal sectional view showing the ultrasonic transceiver of the present invention of FIG. 1.
Figure 3:
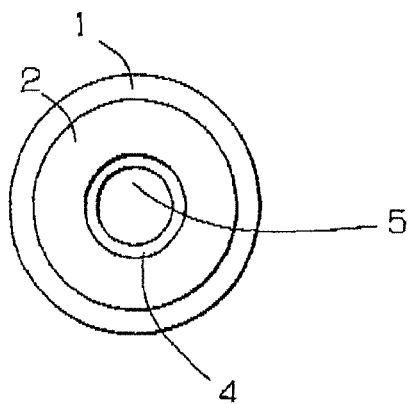
FIG. 3 is a left side view showing the ultrasonic transceiver of the present invention of FIG. 1.

The third embodiment is different from the first embodiment shown in FIGS. 1 to 3 in that the ultrasonic transceiver of the first embodiment is divided into an upper half part 32 and a lower half part 35. Each of upper and lower half parts 32, 35 is configured of a transmitting body half 34 and a ultransducer half 33 having a substantially semicircular cross section and closely fixed to the substantially semicircular bottom surface of transmitting body half 34 like in the first embodiment. The remining parts of the third embodiment are similar to the corresponding ones of the first embodiment, and therefore, a detailed explanation thereof will be omitted.

The use of the present invention described above makes it possible to propagate the ultrasonic vibration efficiently to the fluid in the measurement pipe, and a highly accurate measurement is made possible. Especially, a micro flow rate can be measured with a high accuracy and, further, the installation in a smaller space is made possible in the semiconductor field, etc. For example, as a variation of the first embodiment, transmitting bodies 1, 12 may be integrated with measurement pipe 6 which is made of the same rubber material as transmitting bodies 1, 12. In this case, since transmitting bodies 1, 12 are integrated with measurement pipe 6, the ultrasonic vibration can be propagated efficiently.

The invention claimed is:

1. An ultrasonic flowmeter comprising two ultrasonic transceivers mounted in spaced relation to each other in an axial direction on an outer peripheral surface of a pipe through which a fluid flows, said ultrasonic flowmeter determining a flow velocity of said fluid by receiving an ultrasonic vibration transmitted from one of said two ultrasonic transceivers through said fluid in said pipe, alternately switching between the ultrasonic transceiver at the transmitting end and the ultrasonic transceiver at the receiving end, and measuring the ultrasonic wave propagation time between said two ultrasonic transceivers, wherein each of said ultrasonic transceivers comprises a cylindrical transmitting body closely fixed to the outer peripheral surface of said pipe so as to surround said pipe and an ultrasonic transducer surrounding said pipe and spaced apart from the outer peripheral surface of said pipe, said transmitting body having an axial end surface perpendicular to the axis of said pipe, said ultrasonic transducer having axial end surfaces one of which is fixedly secured to said axial end surface of said transmitting body, said ultrasonic transducer adapted to be extended and contracted in an axial direction thereof by applying a voltage between said axial end surfaces of said ultrasonic transducer, wherein an ultrasonic vibration generated by said ultrasonic transducer is transmitted through said transmitting body to said pipe, and wherein said transmitting body is made of a rubber material.

2. The ultrasonic flowmeter according to claim 1, wherein said pipe has an outer diameter D and said transmitting body is formed with a through hole having an inner diameter d determined so as to satisfy a relation of $0.8D \leq d \leq 0.95D$.

3. The ultrasonic flowmeter according to claim 2, wherein said rubber material has a cis-1,4 bond content.

4. The ultrasonic flowmeter according to claim 2, wherein said transmitting body is made of butadiene rubber or a copolymerized rubber of butadiene and an additive.

5. The ultrasonic flowmeter according to claim 1, wherein said rubber material has an ultrasonic wave attenuation rate of 0 to 50 dB/cm·MHz.

6. The ultrasonic flowmeter according to claim 5, wherein said rubber material has a cis-1,4 bond content.

7. The ultrasonic flowmeter according to claim 6, wherein said transmitting body is of a shape having an outer diameter progressively decreasing from the axial end surface with said ultrasonic transducer fixedly secured thereto toward the other axial end surface.

8. The ultrasonic flowmeter according to claim 7, wherein said ultrasonic transducer has a shape of a disk with a center hole.

9. The ultrasonic flowmeter according to claim 8, wherein said ultrasonic transducer is divided into a plurality of parts in the peripheral direction along the outer peripheral surface of said pipe.

10. The ultrasonic flowmeter according to claim 9, wherein said pipe is made of resin.

11. The ultrasonic flowmeter according to claim 9, wherein said transmitting body is integrated with said pipe.

12. The ultrasonic flowmeter according to claim 8, wherein said pipe is made of resin.

13. The ultrasonic flowmeter according to claim 8, wherein said transmitting body is integrated with said pipe.

14. The ultrasonic flowmeter according to claim 5, wherein said transmitting body is made of butadiene rubber or a copolymerized rubber of butadiene and an additive.

15. The ultrasonic flowmeter according to claim 14, wherein said transmitting body is of a shape having an outer diameter progressively decreasing from the axial end surface with said ultrasonic transducer fixedly secured thereto toward the other axial end surface.

16. The ultrasonic flowmeter according to claim 15, wherein said ultrasonic transducer has a shape of a disk with a center hole.

17. The ultrasonic flowmeter according to claim 16, wherein said ultrasonic transducer is divided into a plurality of parts in the peripheral direction along the outer peripheral surface of said pipe.

18. The ultrasonic flowmeter according to claim 17, wherein said pipe is made of resin.

19. The ultrasonic flowmeter according to claim 17, wherein said transmitting body is integrated with said pipe.

20. The ultrasonic flowmeter according to claim 16, wherein said pipe is made of resin.

21. The ultrasonic flowmeter according to claim 16, wherein said transmitting body is integrated with said pipe.

* * * * *